United States Patent [19]

Vork et al.

[11] Patent Number: 4,942,899

[45] Date of Patent: Jul. 24, 1990

[54] CARTRIDGE PRESSURE REGULATOR

[75] Inventors: William D. Vork, Edina; James H. Larson, Coon Rapids, both of Minn.

[73] Assignee: Graco Inc., Minneapolis, Minn.

[21] Appl. No.: 377,474

[22] Filed: Jul. 10, 1989

[51] Int. Cl.$^5$ ............................................. G05D 16/08
[52] U.S. Cl. ............................ 137/454.5; 137/505.42; 251/120
[58] Field of Search .............. 137/454.2, 454.5, 454.6, 137/505.34, 505.35, 505.39, 329.01, 505.42; 251/120

[56] References Cited

U.S. PATENT DOCUMENTS

| | | | |
|---|---|---|---|
| 585,132 | 6/1897 | Stromvall | 137/329.2 |
| 1,476,253 | 12/1923 | Hewitt | 137/505.39 X |
| 2,160,849 | 6/1930 | Fausek et al. | 137/329.01 X |
| 2,272,243 | 2/1942 | Jacobsson et al. | 137/454.5 |
| 2,702,561 | 2/1955 | Geffroy | 137/505.42 X |
| 3,139,902 | 7/1964 | Thomas | 137/505.42 X |
| 3,250,288 | 5/1966 | Hammon | 137/454.2 X |
| 3,552,431 | 1/1971 | Schmidlin | 137/505.42 |
| 3,698,420 | 10/1972 | Grundy et al. | 137/329.06 |
| 3,791,412 | 2/1974 | Mays | 137/505.42 X |
| 4,190,075 | 2/1980 | Kayser | 137/329.1 |
| 4,474,207 | 10/1984 | Rosenberg | 137/505.28 |
| 4,741,359 | 5/1988 | Siebald | 137/505.42 |

FOREIGN PATENT DOCUMENTS 664158  8/1938  Fed. Rep. of Germany .............. 137/505.34

Primary Examiner—Stephen M. Hepperle

[57] ABSTRACT

A fluid pressure regulator is designed with a removable cartridge in which all of the wetted parts of the regulator which are subject to wear by the fluid may be removed from the housing of the regulator without detaching the housing from the plumbing to which it is attached. The valve and valve actuator are designed so as to encourage relatively high velocity fluid flow there through so as to prevent clogging and settling of material therein. The valve actuator is also designed to produce divergent flow outwardly to the diaphragm perimeter preventing clogging and setting of material therein.

2 Claims, 1 Drawing Sheet

U.S. Patent    Jul. 24, 1990    4,942,899
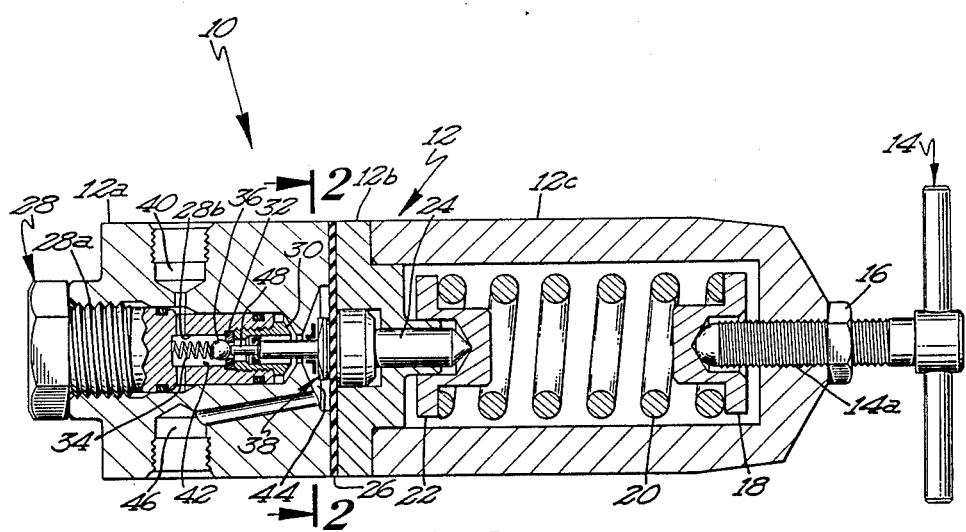
Fig 1
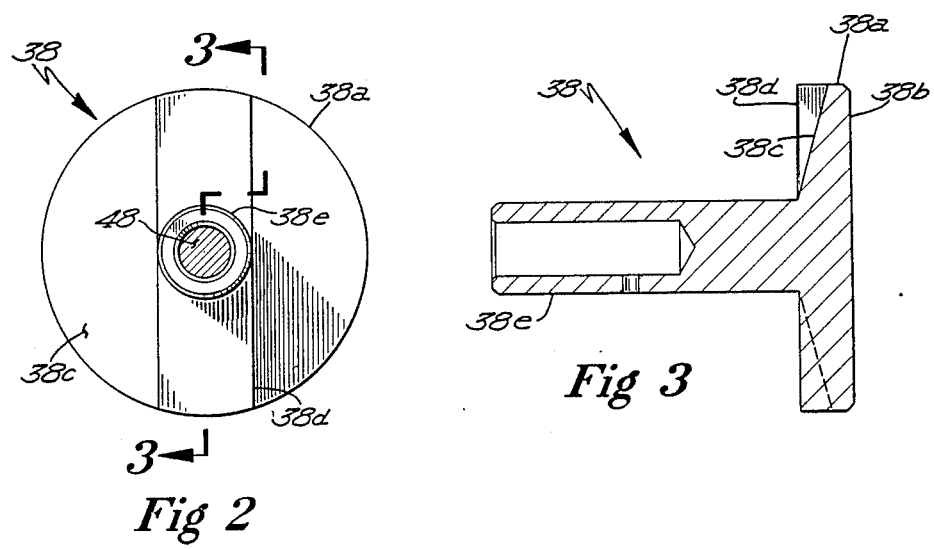
Fig 2
Fig 3

4,942,899

CARTRIDGE PRESSURE REGULATOR

BACKGROUND OF THE INVENTION

Pressure regulators of many types are old and well known for regulation of the pressure of fluids in various types of systems such as paint circulation systems. Such regulators are typically provided with a diaphragm which is spring loaded and which seats and unseats a ball or other ceiling member depending on the pressure on the diaphragm. Such regulators generally work well but suffer at times from a tendency to clog, particularly when used with certain materials.

It is therefore an object of this invention to provide a pressure regulator which is much less susceptible to clogging than the conventional state of the art regulators.

It is further an object of this invention to provide a pressure regulator which is easily serviced and even more desirably which may be easily serviced without removal of the regulator from the plumbing to which it is attached.

It is further an object of this invention to provide such a regulator which is easily and inexpensively manufactured and which functions effectively in the environment in which it is intended to be applied.

SUMMARY OF THE INVENTION

A pressure regulator is provided with a housing having an axis along which the various components are generally arranged. A cartridge member is threaded into one end of the member along the axis. The cartridge member contains a ball, a seat, a relatively light spring biasing the ball against the seat and a valve actuator which enters one end of the cartridge member from a diaphragm chamber in the main housing which is defined at one end by the diaphragm.

When it is desired to service the device, the cartridge is removed taking with it the ball, the spring and the seat leaving only the valve actuator and the diaphragm in the housing remaining of the wetted parts of the assembly. These remaining parts are not prone to clogging, particularly due to (1) the relatively small diameter and concurrent high velocities induced and (2) the shaping of the valve actuator. The diaphragm chamber and passages are also generally not prone to clogging.

The backside, that is the stem side of the valve actuator, is provided with a ridge which runs across the diameter of the body and which tends to encourage flow through the diaphragm chamber such as to keep it in a generally flushed condition.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a cross-sectional view of the regulator of the instant invention.

FIG. 2 is a cross-sectional view of the valve actuator.

FIG. 3 is a sectional view taken along 3—3 of FIG. 2.

DESCRIPTION OF THE PREFERRED EMBODIMENT

The instant invention, generally designated 10, is comprised of a housing 12 comprised of a fluid section 12a, a spring base 12b and a spring cover 12c. Threaded into one end of spring cover 12c is an adjustment handle 14 having a threaded stem 14a on which is also threaded a locking nut 16. The end of threaded stem 14a rotates in a spring retainer 18 which retains one end of a spring 20 within spring cover 12c. The other end of spring 20 is retained by a second spring retainer 22 which in turn presses on a diaphragm actuator 24 which in turn presses on a diaphragm 26 sandwiched between spring base 12b and fluid section 12a.

The various sections are retained together by longitudinal bolts not shown in this drawing. Of course any other appropriate mechanism can be used to retain the various pieces.

A cartridge member 28 is generally cylindrical and threaded into the end of housing 12a by means of screw threads 28a. A retaining member 30 is screwed into the end of cartridge member 28 and retains seat 32 therein against a ridge in cartridge member 28. A spring 34 at the bottom of bore 28b biases ball 36 against seat 32. Thus, when it is desired to service the device because of wear or clogging, one need merely unscrew cartridge member 28 from housing 12 and replace it with a new member.

A valve actuator 38 is shown in more detail in FIGS. 2 and 3 and is comprised of a head 38a and a stem 38e. Head 38a has a diaphragm side 38b and a stem side 38c on which is located a rib 38d which runs across the diameter of head 38a.

As can be seen in FIG. 1, an inlet 40 leads into an inlet chamber 42 which is open and closed by ball 36. Flow thence passes into (when ball 36 is unseated) diaphragm chamber 44 and thence into outlet passage 46.

Operation in general of the instant invention is quite conventional. Handle 14 is screwed down to provide the desired pressure through spring 20 to actuating stem 24 which presses downwardly through diaphragm 26 to valve actuator 38 which in turn presses through pin 48 to unseat ball 36 from seat 32. Thence, when the pressure in diaphragm chamber 44 has reached the desired level, the force thereon counteracts the spring force from spring 20 and moves the diaphragm to the right as shown in FIG. 1 thereby allowing spring 34 to seat ball 36 on seat 32 and prevent flow as long as the pressure remains of the desired level. Once the pressure has dropped below the desired level, the aforementioned process is repeated.

It can be seen that all of the parts of the regulator susceptible to wear and/or clogging are easily removable from the housing and that in the process of doing so, the housing may be let plumbed into place in a system in which it is located thereby further reducing maintenance time.

It is contemplated that various changes and modifications may be made to the pressure regulator without departing from the spirit and scope of the invention as defined by the following claims.

What is claimed is:

1. A fluid pressure regulator comprising a housing having an inlet and outlet, a diaphragm, a ball, a ball retainer, a seat, a valve actuator means for biasing said diaphragm, the improvement comprising:

a cartridge member removably retained in said housing, said ball, said ball retainer and said seat being located in said cartridge member such that said cartridge member containing said ball, said ball retainer, said seat and may all be removed from said housing, as a unit;

a diaphragm chamber containing said diaphragm and said actuator, said inlet connecting to said chamber and sized so as to maintain flow velocity through said regulator as a relatively high level and directing said flow through said chamber so as to continually flush said chamber, said actuator comprising a head having a diaphragm side and a stem side, said diaphragm comprising a perimeter and said actuator stem side comprises a diametral angular rib for directing flow through said chamber to said perimeter.

2. A fluid pressure regulator comprising a housing having an inlet and outlet, a diaphragm, a ball, a ball retainer, a seat, a valve actuator means for biasing said diaphragm, the improvement comprising:

a cartridge member removably retained in said housing, said ball, said ball retainer and said seat being located in said cartridge member such that said ball said retainer, said seat and said member may be removed from said housing as a unit; and a diaphragm chamber containing said diaphragm and said actuator, said actuator comprising: a heat having a diaphragm side and a stem side; said actuator stem side comprising a diametral rib for directing flow through said chamber, said inlet connecting to said chamber and sized so as to maintain flow velocity through said regulator as a relatively high level and directing said flow through said chamber so as to flush said chamber.

* * * * *

UNITED STATES PATENT AND TRADEMARK OFFICE
CERTIFICATE OF CORRECTION

PATENT NO. : 4,942,899

DATED : July 24, 1990

INVENTOR(S) : William D. Vork and James H. Larson

It is certified that error appears in the above-identified patent and that said Letters Patent is hereby corrected as shown below:

In the claims, Column 4, Line 7, the word "heat" should be changed to --head--.

Signed and Sealed this

Twenty-sixth Day of November, 1991

Attest:

HARRY F. MANBECK, JR.

*Attesting Officer*

*Commissioner of Patents and Trademarks*